United States Patent [19]

Occhini et al.

[11] 4,224,462

[45] Sep. 23, 1980

[54] HIGH VOLTAGE, ELECTRIC SUBMARINE CABLE WITH INSULATION OF LONGITUDINALLY VARYING VOLTAGE BREAKDOWN STRENGTH

[75] Inventors: Elio Occhini; Aldo Morello, both of Milan, Italy

[73] Assignee: Industrie Pirelli S.p.A., Milan, Italy

[21] Appl. No.: 18,766

[22] Filed: Mar. 8, 1979

[30] Foreign Application Priority Data

Mar. 21, 1978 [IT] Italy .............................. 21391 A/78

[51] Int. Cl.$^2$ .......................... H02G 9/02; H01B 7/14; H01B 9/06

[52] U.S. Cl. .................................. 174/37; 174/25 R; 174/25 G; 174/68 R

[58] Field of Search .................... 174/24, 25 R, 25 G, 174/26 R, 26 G, 37, 68 R, 70 R, 70 S

[56] References Cited

U.S. PATENT DOCUMENTS

| | | | |
|---|---|---|---|
| 4,118,593 | 10/1978 | Borroni | 174/26 R |
| 4,132,084 | 1/1979 | Francisco-Arnold | 174/24 X |

OTHER PUBLICATIONS

"Vancouver Island Tie Cable Ordered", *Electrical World,* Mar. 1, 1954, p. 52.

Gazzana–Priaroggia, R, et al., "The Long Island Sound Submarine Cable Interconnection", *IEEE Spectrum,* vol. 8, No. 10, Oct. 1971, pp. 63–71.

Bowers, W. E., "High Strength-to-Weight Cable for Deep Ocean Projects", *Electrical Communication,* vol. 49, No. 2, 1974, pp. 177–182.

*Primary Examiner*—Laramie E. Askin
*Attorney, Agent, or Firm*—Brooks, Haidt, Haffner & Delahunty

[57] ABSTRACT

A submarine cable and an electric power line using such cable for transmitting electric power at high voltge from a first point adjacent the surface of a water body to a second point adjacent the surface of a water body, a portion of the cable lying in great water depths where the hydrostatic pressure is high. The cable comprises at least three sections, each section having its insulation dimensioned or selected for operation at the high voltage when subjected to the ambient pressures. The section, or sections, lying at great depths has insulation with a voltage breakdown strength which varies with pressure, the strength increasing with pressure, so that the insulation thereof may be less than would be required if the such sections were to be used under pressures less than those at the great depths.

12 Claims, 6 Drawing Figures

HIGH VOLTAGE, ELECTRIC SUBMARINE CABLE WITH INSULATION OF LONGITUDINALLY VARYING VOLTAGE BREAKDOWN STRENGTH

The present invention relates to an improvement in the electrical connection lines for transmitting electrical power at high voltage, which lines predominantly have under water paths and which also rest at relatively great depths in the water.

By the term "great depths", reference is made to depths, such as sea-bottoms, that are at least 100 meters below the water surface.

The conventional electrical lines prevalently found at low submarine depths usually comprise cable lengths of the same type, or having the same structural and design characteristics along their entire path, which are connected to each other in a per se known way. Such lines can give rise to drawbacks of various natures when the said lines have sections reaching down to great depths.

For selecting the type of cable to be utilized for providing a given electric line, many factors have to be considered, but amongst these factors, the prime factor is the working voltage. For example, for voltage up to 300 kV and with direct current, preferably, cables that are already known to those skilled in the art as impregnated paper cables, the insulation of which is completely impregnated with a viscuous compound, such compound not being under gas pressure, are used.

On the other hand, cables having paper impregnated with a mixture under gas pressure are suitable for up to 400 kV with direct current. These are uni-polar cables which, after being laid, are placed under gas pressure along their entire path by means of a small duct at the center of the conductor. Cables of the self-contained type, impregnated with a dielectric fluid under pressure, and known to those skilled in the art as oil-filled cables, can be used up to 600 kV and above.

All three types of cables described hereinbefore cannot be laid or made to function at great depths without requiring some reinforcement or strong armoring. This however, increases the weight of the cable, thereby giving rise to a series of other requirements, such as, an increase in the dimensions of the cable-laying apparatus which must exercise a braking force proportional both to the weight of the cable in the water and to the depth of the water. The cable-laying apparatus has to rest on a suitable floating stage or a cable-laying ship. The choice of either depends directly on the weight and dimensions of the cable itself. Also, the more robust the reinforcements and the armoring, the more is the stiffness of the cable, thereby rendering it difficult to collect the cable into coils.

A cable constituting an electrical submarine line, a section of which lies below a depth of 100 m, and which has structural and design characteristics similar to those of sections for low depths, is electrically over-dimensioned with respect to its effective electrical requirements. This is because beyond a depth of 100 m, the water pressure acting upon the cable permits use of a design with a higher electrical gradient for the insulation. It is known, in fact, to those skilled in the art, that an increase of the pressure p applied to a dielectric constituted by variously impregnated paper tapes, produces an increase in the electrical perforation gradient E according to a curve. The numerical values of E vary, depending upon the type of insulation and upon whether or not the applied voltage is alternating (industrial frequency), direct or in the form of pulses.

The ideal would be to have a cable which operates at a selected high voltage which has insulation which has a thickness at every point corresponding to the electrical gradient allowed by the hydrostatic pressure exercised externally by the water at every point. A first type of cable could thus be obtained which dimensionally tapers to a smaller size as in the direction towards the sea-bottom and which increases its thickness as the depth of the water in which the cable is immersed decreases. Alternatively, a second type of cable that is telescopic, in both directions, could be used.

Any embodiments of the first type of cable would present insurmountable technical difficulties of construction, of laying, of spare parts, etc. Those of the second type would comprise a considerable number of joints which would be undesirable because this would cause the cable to be subject to an increased possibility of breakdown at the joints which are known to be critical.

The present invention has, as one object, the overcoming of the above-mentioned drawbacks. In accordance with the invention, there is provided a composite type cable suitable for use at great depths and over long distances, said cable having planned characteristics, in the various parts of its path, that are, as far as possible, adapted to the surrounding ambient, i.e. above all, variable with regard to the laying depth of the cable under water, e.g. greater than 100m., and to the length of each section.

In particular, the invention takes advantage of the higher hydrostatic pressure acting upon the electrical line at great depths. That is to say, the applicants have taken into consideration the fact that, at the higher pressure acting upon the line, there is a corresponding higher electrical strength of the insulation, thereby permitting an electrical line having sections with a reduced insulation thickness. A thus constructed electrical line would result in having a reduced thickness of the insulation as compared to the conventional electrical lines, and hence, it would have smaller dimensions and a lighter armoring which would reduce its total weight and thereby make the laying operation easier, since the braking force that the cable-laying apparatus must stand is reduced.

Moreover, the smaller dimensions of the cable insulation permits the reception of longer lengths inside the impregnating tanks, with consequent reduction of the number of joints which would be needed for the entire cable path. Hence, this renders the functioning more reliable and the maintenance problems fewer. As a matter of fact, it is well known that the submarine cable joints, even though of the flexible type, and formed according to the most advanced techniques, do constitute a critical point in this type of connection.

Another advantage assured by the increase of pressure on the dielectric is to allow an increase in the working voltage, proportional to the increase in the perforation gradient, without increasing the insulation thickness. In particular, it is possible (limited to great depths) to increase from 300kV to 400kV the working direct current of the cables having impregnated paper by using, at great depths, an insulation thickness that is equal to (or a little above) that used for 300kV.

More particularly, the principal object of the present invention is to provide an electrical line constituted by at least one insulated conductor, at least one metallic sheath with a covering of plastic material and an armoring, said electric line being especially adapted for transmitting high voltages, and having predominantly a submarine path reaching great depths, characterized by the fact that it comprises at least a first, a second and a third section, connected one to the other in series by appropriate joints, said first and third sections being destined to be laid at smaller depths where the hydrostatic pressure is lower, and said second section being destined to be laid at greater depths where the hydrostatic pressure is higher, said second section having an insulation on its conductor that is dimensioned, along its entire length according to the outside hydrostatic pressure, said dimension being suitable for withstanding the electrical gradient up to a value appropriate for operation at the selected voltage at which the line is to operate.

A preferred form of embodiment employs insulation on the conductor of the said second section which is constituted by a paper impregnated with a viscous impregnating compound, such compound being known in the art.

In a preferred form of embodiment the section, or sections, which is destined to be laid at smaller depths is constituted by a cable having an insulation on the conductor made of paper impregnated with a dielectric fluid under pressure.

In another preferred form of embodiment, the section, or sections, destined to be laid at smaller depths has on its conductor an insulation made of paper impregnated with an impregnating compound which is under gas pressure.

In another preferred form of embodiment, the insulation of the said second section, which is destined to be laid at great depths, is dimensioned as a function of the value of the external hydrostatic pressure brought to bear upon the section at the minimum depth of the section itself, such minimum depth being within a depth range of 120m, to 160m.

Other objects and advantages of the present invention will be apparent from the following detailed description of the presently preferred embodiments thereof, which description should be considered in conjunction with the accompanying drawings in which.

Figure 1:
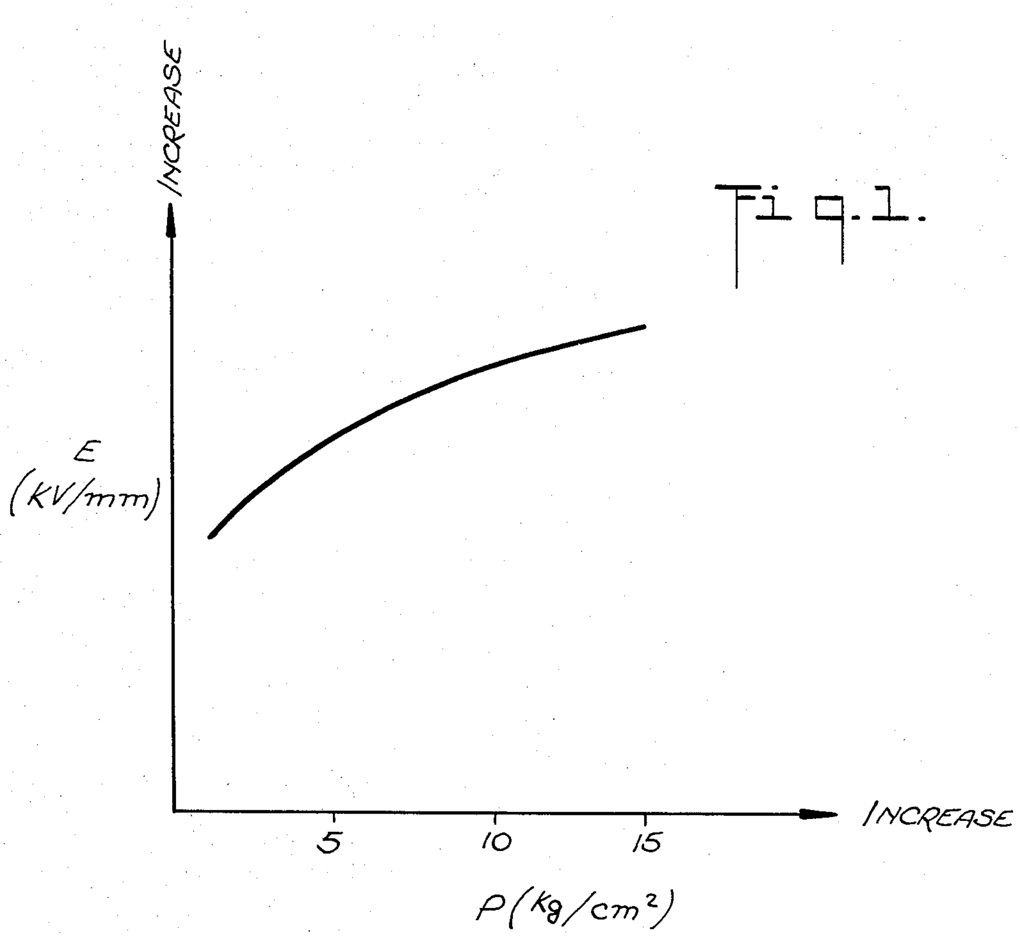
FIG. 1 is a graph illustrating the variation of the voltage breakdown strength of impregnated paper tapes with variation of pressure applied thereto.

As illustrated in FIG. 1, the breakdown voltage E of the impregnated paper tape insulation of a cable, expressed in kilovolts per millimeter, increases with the pressure P applied thereto and expressed in kilograms per square centimeter. Accordingly, for example, a cable which is suitable for operation at a given voltage, e.g. 300 KV, in an atmospheric pressure ambient, can operate satisfactorily at a higher voltage, e.g. 400 KV, if it is subjected to a super-atmospheric pressure ambient of sufficient magnitude.

Figure 2:
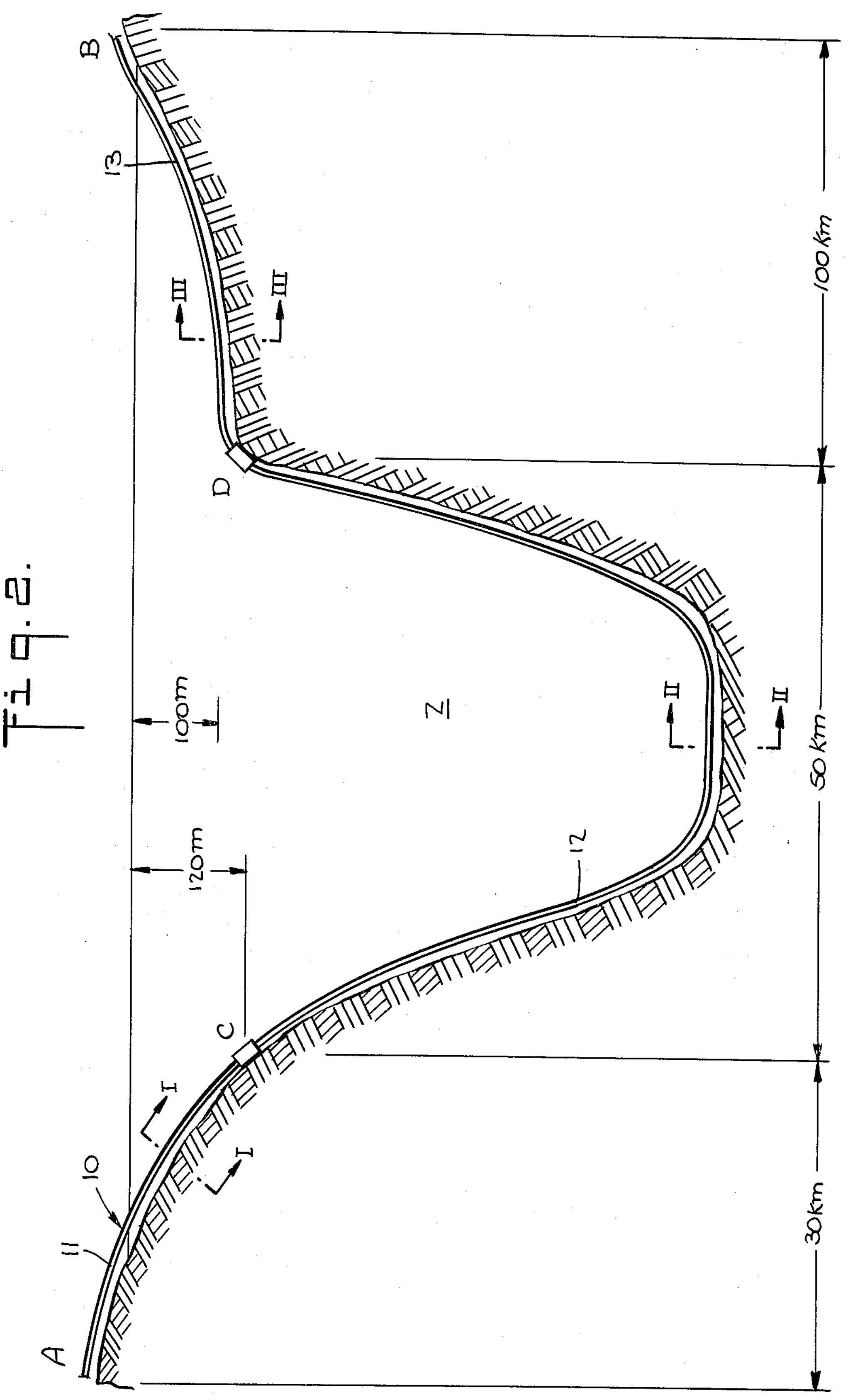
FIG. 2 illustrates schematically, the path of an electrical line according to the invention.

In FIG. 2, there is illustrated an electrical uni-polar, or single conductor, line 10, but it is to be understood that the invention can also be applied to multipolar, or multiple conductor, lines. In particular, the electrical line 10 exemplified in FIG. 2, is especially adapted for high voltages and for operating with direct current at 400 KV. It should be understood, however, that the described invention applies even in the case of alternating current and may be used at voltages different from 400 KV.

Said electrical line 10 interconnects two above water points A and B (for example 180 km apart) by passing through a zone Z having a great depth. The above water points A and B are both placed on land. The electrical line 10 comprises at least three sections, i.e. a first section 11, a second section 12 and a third section 13. By "section" is meant here, a length of cable or a plurality of lengths of cable that have the same characteristics and are connected in series in a known way, e.g. by means of connecting joints. Thus, if the section length is sufficiently short, the section may be a single cable which is uniform throughout its length, whereas if a section length is longer than a practical length for the manufacture of a continuous cable length, then, the section may be a plurality of lengths of cable which are uniform throughout their lenghts and of the same construction, such lengths of cable being electrically interconnected by joints to form a section. Accordingly, each cable length in each section is electrically connected to all the other cable lengths.

The first section 11 of the cable 10 is intended for use at relatively low depths (in the illustrated case, predominantly low depths). The section 11 extends from the above water point A, to the submerged point C which is at a depth of 120m.

The distance of point C from the above water point A is assumed to be about 30km. In the section 11, which lies primarily at a depth of less than 100m, optimum electrical performance can be obtained with oil-filled cables. The hydraulic conditions are such, due to the relatively short distance between the above water point A and the submerged point C, that the drop in pressure of the oil within the section is kept within acceptable limits.

Figure 3:
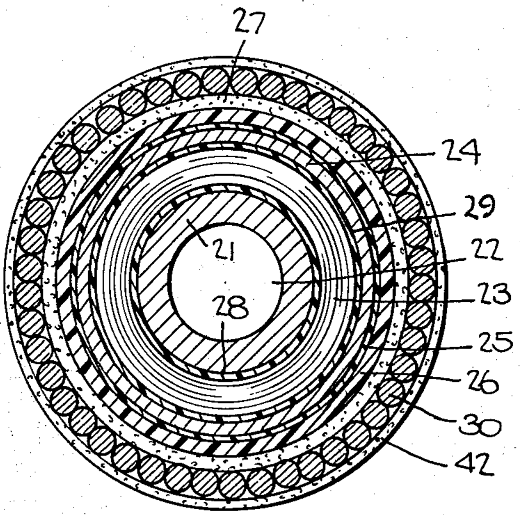
FIG. 3 illustrates schematically the transverse cross-section I—I, of the first section of the electrical line of FIG. 2.

Said oil-filled cable 11 can be constituted, as shown in FIG. 3, by a conductor 21 which has a longitudinal oil-duct 22. The conductor 21 is covered by an insulation 23, a first semi-conductive tape 28 on the conductor 21 and under the insulation 23, and a second semi-conductive tape 29 over the insulation 23. Over the thus formed core, there is extruded a lead sheath 24 that bears a reinforcing helix 25. Over the reinforcing helix 25, there is extruded a sheath 26 of plastic material (for example, polyethylene). On the sheath 26, there is disposed a layer 27 of soft material (for example, jute) over which there is applied an armoring 30, comprising wires or tapes disposed with a long pitch. For enclosing the whole, there is a further wrapping 42 of tarred jute yarn, or some similar material.

The section 13, which extends from the above water point B to the submerged point D, is intended for use at relatively low depths. It is disposed, for its greater part, at a depth of less than 100m., or a little over said depth, e.g. 120m. Nevertheless, assuming that the length of the section 13 is about 100 Km. it is advisable to employ a cable with paper insulation impregnated with a viscous impregnating compound, said cable being kept under pressure by means of gas (for example, nitrogen) which does not give rise to important pressure drops even when great lengths are involved. Such impregnating compound is well known in the art (see, for example, "Power Cables and Their Application", page 32, published by Siemens Aktiengesellschaft, 1970) and is an oil or an oil resin mixture which has a viscosity such that migration does not occur with small differences in elevation of cable portions. One such compound is sold as NAPVIS DE/10 by Nafta Chemie, Paris, France.

Figure 5:
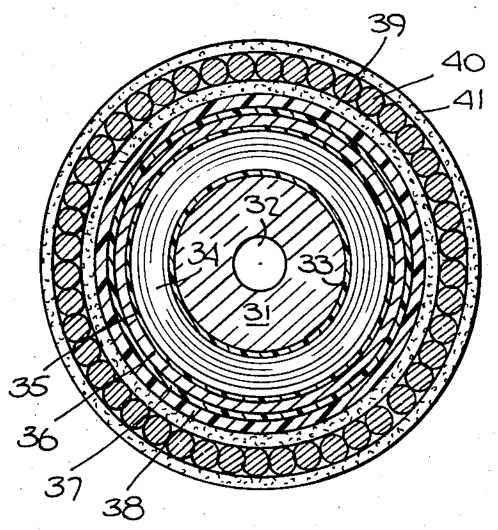
FIG. 5 illustrates schematically the transverse cross-section III—III, of the third section of the electrical line of FIG. 2.

The pressurized gas cable 13 can be constructed as shown in FIG. 5. The conductor 31 has a duct 32 for the gas, and it is covered by a semi-conductive tape 33 on which there is disposed an insulation 34, made of paper insulated with a viscous impregnating compound, which, in its turn, is covered by a screening semi-conductive tape 35. The whole is then contained in a lead sheath 36 on which is placed the blindage 37. A sheath 38 of plastic material (for example, polyethylene) is extruded onto the said blindage 37. Over the sheath 38, there is placed a soft layer 39 (for example, jute), then the armoring 40 and finally, a further layer of tarred jute yarn 41, or a similar tarred material, wrapped around the armoring 40.

The section 12, from point C to point D, is disposed totally in the zone that lies at a depth greater than 100m. In other words, section 12 is intended to be laid at great depths. To be more precise, in the example, the waterhead on the entire section 12 is 120m. at least.

Section 12 consists of a cable, insulated with a paper impregnated with a viscous impregnating compound of said known type. A preferred embodiment of the section 12 is illustrated in a transverse cross-section in FIG. 4.

Around the conductor 14, there is provided paper insulation 15 impregnated with a mixture. One screening tape 43 is provided under the insulation 15, and another screening tape 44 is provided over said insulation 15. Over the core, which comprises the conductor 14, the insulation 15 and the tapes 43 and 44, there is extruded a lead sheath 16. A sheath 17, made of polyethylene, is extruded onto the lead sheath 16. Over the polyethylene sheath 17, there is disposed a jute layer 18 which holds the anti-torsional armoring 19, which in its turn, is covered by a layer 20, said layer being obtained by wrapping tarred jute yarn around said armoring.

The transverse cross-section of the illustrated section 12 has an elliptical form (but it could also have a form different to this) which is shaped in such a way that the water pressure contributes eventually towards ovalization, without producing dangerous deformation, which can occur in a cable of circular section when it is subjected to high pressures and which, hence, constitute extremely weak points in the cable.

The insulation 15 is suitable for exploiting the hydrostatic pressure of the external ambient in which it is placed, i.e. it is dimensioned as a function of the external hydrostatic pressure at a depth of 120m. This hydrostatic pressure, in the embodiment indicated, is used as the one suitable for designing the insulation gradient at an appropriate value, that is, for the operation of section 12 at 400 kV. Of course, the insulation 15 can also be dimensioned with reference to the external hydrostatic pressures that differ from those cited above—but which are equal to those at the minimum depth where the said section 12 is placed. Preferably, but not necessarily, the minimum depth of said section 12, lies between 120m. and 160m.

Figures 4, 6:
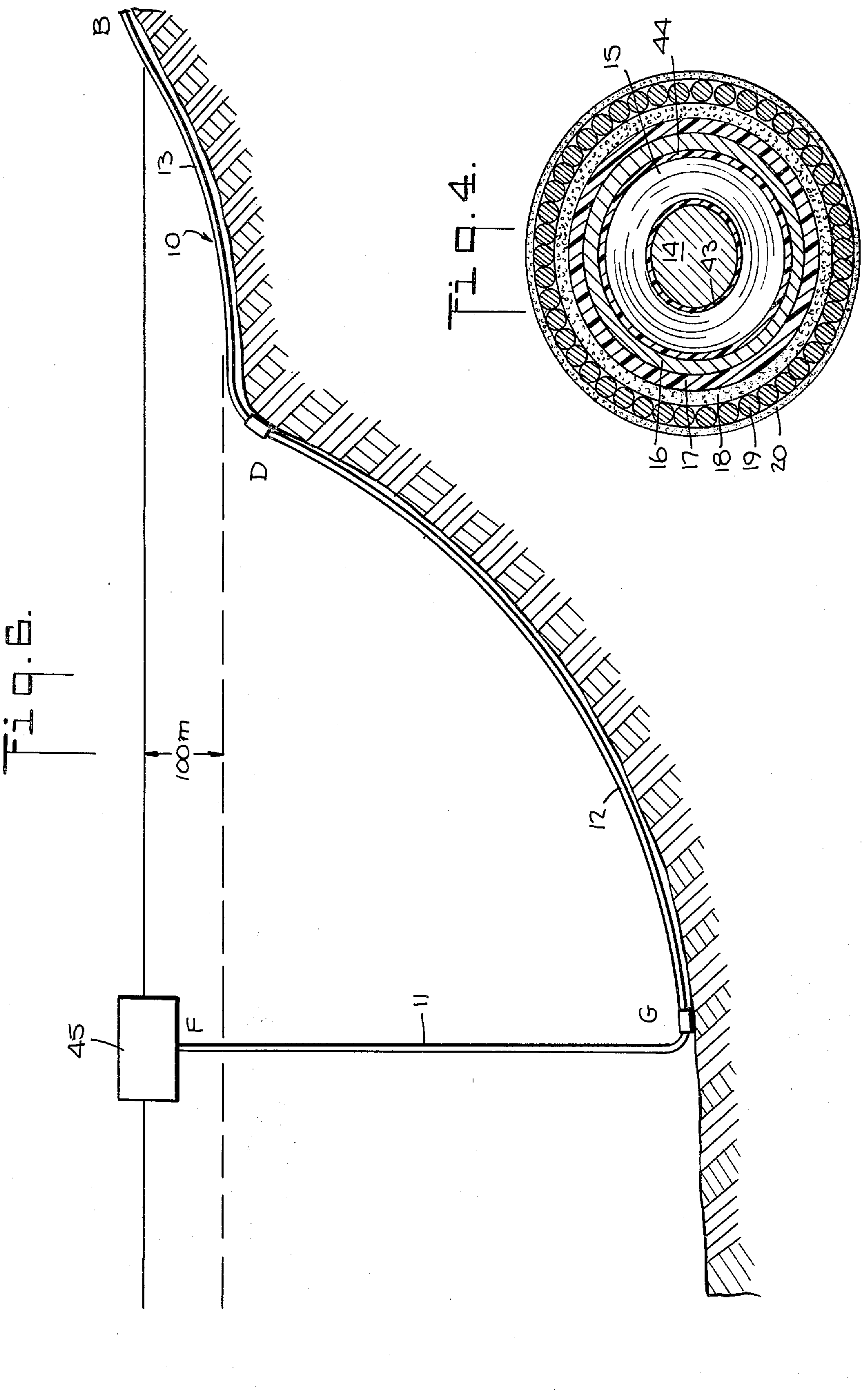
FIG. 4 illustrates schematically the transverse cross-section II—II, of the second section of the line of FIG. 2.
FIG. 6 illustrates schematically a further path for an electrical line according to the invention.

The electrical line 10 may, of course, be constructed differently from what is indicated in FIG. 1. For example, as is shown in FIG. 6, the line 10 may connect a floating station, in the open sea, to the point B on land. In FIG. 6, the section 11 which, in the previous embodiment, was to be laid at relatively low depths, has its lower portion at great depths. As a matter of fact, it connects the point G, at great depths, to point F in the floating station 45 which is confined to a small area and which is in a position perpendicular to point G. Section 11 has to be constituted by a special cable that is extremely flexible for withstanding the oscillations that are caused by the shifting about of the raft due to the motion of sea waves, its structure having to be stabilized, at various points thereon, depending upon the working characteristics for which it is designed.

The sections 11, 12 and 13, are connected to each other, in series, by appropriate joints, such as, for example, the sealed joints adjacent the letters G and D in FIG. 6, as required by the design. Of course, the outer sections 11 and 13 of the electrical line 10 can be of different types, such as those described. For example, both can be under gas pressure or of the oil-filled type depending on the characteristics designed for the electrical line 10.

Whenever the above water points A and B, which are to be connected to the high voltage electric line, are not very distant one from the other, for example, less than 30 km, the best electrical performance can be obtained by means of sections all constituted by oil-filled cables. The section which is destined to be laid at great depths has an insulation dimensioned according to the hydrostatic external pressure that bears upon its portion thereof which is subjected to the lowest pressure within such great depths.

The examples illustrated are valid for electrical lines that comprise only a single section to be laid at great depths. In actual practice, it can occur that when there are long distances between points A and B to be connected, the electrical line would comprise more than three sections, wherein one or more sections is to be laid at great depths.

Although preferred embodiments of the present invention have been described and illustrated, it will be understood by those skilled in the art that various modifications may be made without departing from the principles of the invention.

The embodiments of the invention in which an exclusive property or privilege is claimed are defined as follows:

1. A submarine cable for transmitting electrical power at a selected high voltage, said cable comprising:
   a first section of cable with a conductor surrounded by insulation adequate to withstand and operate at said voltage when subjected to a relatively low hydrostatic pressure;
   a second section of cable with a conductor surrounded by insulation adequate to withstand and operate at said voltage when subjected to a hydrostatic pressure higher than said relatively low hydrostatic pressure but inadequate for operation at said voltage when subjected to a lower hydrostatic pressure, said second section being electrically connected at one end to said first section; and
   a third section of cable with a conductor surrounded by insulation adequate to withstand and operate at said voltage when said third section is subjected to a hydrostatic pressure lower than said higher hydrostatic pressure, said third section being electrically connected to the opposite end of said second section.

2. A cable as set forth in claim 1 wherein said insulation of said second section comprises paper impregnated with a viscous impregnating compound, said last-mentioned insulation having a dielectric strength which increases with pressure thereon.

3. A cable as set forth in claim 1 or 2 wherein the insulation of at least one of said first and third sections comprises paper impregnated with a dielectric fluid under pressure.

4. A cable as set forth in claim 1 or 2 wherein the insulation of at least one of said first and third sections comprises paper impregnated with an impregnating compound under gas pressure.

5. A cable as set forth in claim 1 wherein the thickness of the insulation of said second section is less than the thickness of the insulation of at least one of said first and third sections.

6. A cable as set forth in claim 1 wherein said conductor of said second section is elliptical in cross-section.

7. A submarine cable line for transmitting electric power at a selected high voltage, said line extending from a first point adjacent the surface of a water body to a second point adjacent the surface of said water body and intermediate said first point and said second point, through a deep water zone, whereby the pressure to which said cable is subjected varies along the length of said cable, said cable comprising:

a first section of cable with a conductor surrounded by insulation and extending from said first point to said zone, a second section of cable with a conductor surrounded by insulation and extending from said first section through said zone, said second section being electrically connected at one end to said first section; and a third section of cable with a conductor surrounded by insulation and extending from said second section to said second point, said third section being electrically connected to the opposite end of said second section, said insulation of each said section being adequate to withstand and operate at said voltage when subjected to the hydrostatic pressures thereon but said insulation of said second section being inadequate for operation at said voltage when subjected to atmospheric pressure.

8. A line as set forth in claim 7 wherein said insulation of said second section is inadequate for operation at said voltage when subjected to a pressure intermediate atmospheric pressure and the hydrostatic pressure in said zone.

9. A line as set forth in claim 7 or 8 wherein said insulation of said second section comprises paper impregnated with a viscous impregnating compound said last-mentioned insulation having a dielectric strength which increases with pressure thereon.

10. A line as set forth in claim 7 wherein the insulation of at least one of said first and third sections comprises paper impregnated with a dielectric fluid under pressure.

11. A line as set forth in claim 7 wherein the insulation of at least one of said first and third sections comprises paper impregnated with an impregnating compound under gas pressure.

12. A line as set forth in claim 7 wherein the thickness of the insulation of said second section is less than the thickness of the insulation of at least one of said first and third sections.

* * * * *